3,133,074
QUATERNARY 4-PHENYL-4-CARBALKOXY-PIPERIDINIUM DERIVATIVES
Kurt Freter, Herbert Merz, and Karl Zeile, all of Ingelheim (Rhine), Germany, assignors, by mesne assignments, to Boehringer Ingelheim G.m.b.H., Ingelheim (Rhine), Germany, a corporation of Germany
No Drawing. Filed Feb. 20, 1962, Ser. No. 174,413
5 Claims. (Cl. 260—294.3)

This invention relates to quaternary piperidinium derivatives and to a method of preparing them.

More particularly, the present invention relates to quaternary 4-phenyl-4-carbaloxy-piperidinium compounds of the formula

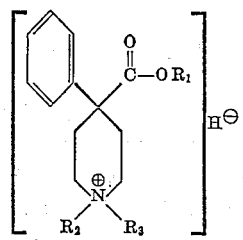
(I)

wherein
$R_1$ is alkyl of 1 to 4 carbon atoms, preferably of 2 to 3 carbon atoms,
$R_2$ is an acyclic hydrocarbon substituent of 3 to 7 carbon atoms, preferably linear alkenyl of 3 to 6 carbon atoms,
$R_3$ is an acyclic unsaturated hydrocarbon substituent of 3 to 7 carbon atoms, preferably linear alkenyl of 3 to 6 carbon atoms, and
X is a non-toxic anion, preferably chlorine or bromine.

In other words, substituents $R_2$ and $R_3$ may be identical to or different from each other, but one of them must be an acyclic unsaturated hydrocarbon having from 3 to 7 carbon atoms, inclusive.

The quaternary compounds of the Formula I may be prepared by methods which are well known in principle. The following method, however, has been found to be especially advantageous, namely quaternization of a substituted piperidine compound of the formula

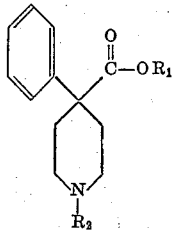
(II)

with a quaternizing agent of the formula $$R_3X \qquad (III)$$

in accordance with the reaction formula

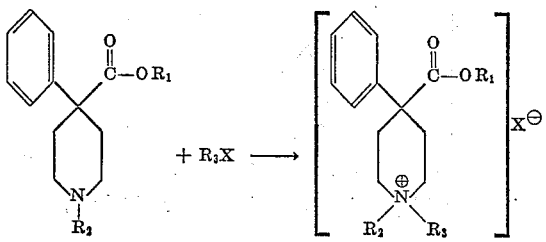

or quaternization of a substituted piperidine compound of the formula

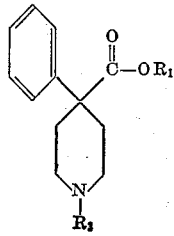
(IIa)

with a quaternizing agent of the formula $$R_2X \qquad (IIIa)$$

in accordance with the reaction formula

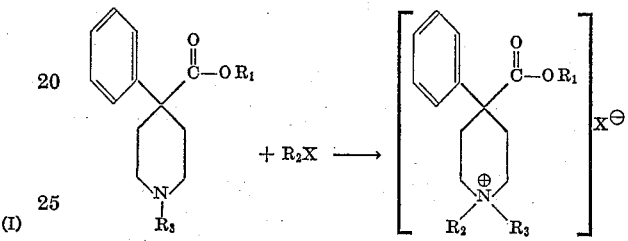

In Formulas II, IIa, III and IIIa and in the reaction formulas the variables $R_1$, $R_2$ and $R_3$ have the same meanings as previously defined in connection with Formula I and X is a halogen, especially chlorine or bromine.

In either case, the quaternization reaction is preferably carried out in the presence of an organic solvent at temperatures between 0 and 100° C. The starting compounds in these reactions can be reacted in a molar ratio of 1:1, but the quaternizing agent is preferably used in excess.

Some of the piperidine compounds of the Formulas II and IIa are, themselves, novel compounds which have not heretofore been described in the prior art, notably 1-allyl-4-phenyl-4-carbomethoxy-piperidine and 1-allyl-4-phenyl-4-carbopropoxy-piperidine. These may be prepared by methods which are well known in principle, for example by the methods described in copending U.S. applications of Kurt Freter, Hans Merz and Karl Zeile, filed on the same day as the present application and, respectively, entitled "1-Allyl-4-Phenyl-4-Carbomethoxy-Piperidine and Its Acid Addition Salts" and "1-Allyl-4-Phenyl-4-Carbopropoxy-Piperidine and Its Acid Addition Salts."

If desired, the quaternary piperidinium halides, in accordance with the above-described quaternization methods may be transformed into corresponding piperidinium compounds wherein the anion X in Formula I is a non-toxic anion other than a halogen, such as sulfate, methane-sulfonate, tartrate, citrate and the like. This exchange of anions may be effected by customary methods, namely by treatnig the piperidinium halide with a base and thereafter acidifying the product with an appropriate acid, such as sulfuric acid, methane-sulfonic acid, tartaric acid, citric acid and the like.

The following examples shall illustrate our invention and enable others skilled in the art to understand it more completely. It should be understood, however, that our invention is not limited to these particular examples.

EXAMPLE I

*Preparation of 1,1-Diallyl-4-Phenyl-4-Carbethoxy-Piperidinium Bromide*

4 gm. (about 0.01 mol) of 1-allyl-4-phenyl-4-carbethoxy-piperidine hydrochloride were dissolved in 20 ml. of water. To the resulting aqueous solution 5 ml.

of a 2 N aqueous sodium hydroxide solution (about 0.01 mol) were added. The solution thus obtained was then extracted three times with ether. The combined ether extracts were dried with magnesium sulfate, the ether was evaporated in vacuo and the residue was dissolved in 20 ml. of acetone. Into this acetone solution 10 ml. (about 0.1 mol) of allylbromide were introduced and the resulting mixture was refluxed for three hours. After cooling overnight, a crystalline substance had separated out. The crystals were filtered off, washed with acetone and recrystallized from a mixture of acetone and water. 3.5 gm. (70% of the theoretical amount) of 1,1-diallyl-4-penhyl-4-carbethoxy-piperidinium bromide of the formula

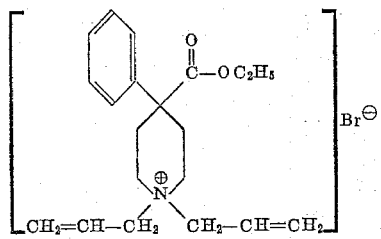

were recovered, which had a melting point of 156–158° C.

EXAMPLE II

*Preparation of 1,1-Dipropargyl-4-Phenyl-4-Carbethoxy-Piperidinium Bromide*

Using the procedure analgous to that described in Example I, 0.01 mol of 1-propargyl-4-phenyl-4-carbethoxy-piperidine hydrochloride was quaternized with about 0.01 mol of propargyl bromide. The quaternization reaction mixture was refluxed for three hours, and after cooling the resulting crystalline reaction product was recrystallized from acetone. 1.55 gm. (40% of theory) of 1,1-dipropargyl-4-phenyl-4-carbethoxy-piperidinium bromide of the formula

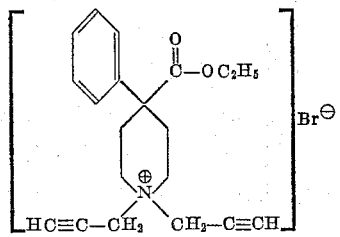

having a melting point of 205–207° C. were obtained.

EXAMPLE III

*Preparation of 1-Propyl-1-Propargyl-4-Phenyl-4-Carbethoxy-Piperidinium Bromide*

Using a procedure analogous to that described in Example I, 0.01 mol of 1-propyl-4-phenyl-4-carbethoxy-piperidine hydrochloride was quaternized with about 0.01 mol of propargyl bromide. The quaternization reaction mixture was refluxed for twelve hours, and after cooling the resulting crystalline reaction product was recrystallized from acetone. 2.15 gm. (55% of theory) of 1-propyl - 1 - propargyl - 4 - phenyl - 4 - carbethoxy - piperidinium bromide of the formula

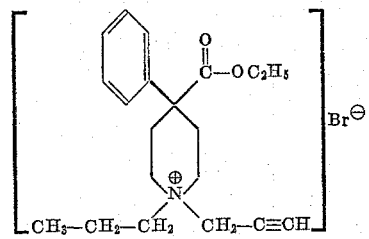

having a melting point of 200° C. were obtained.

EXAMPLE IV

*Preparation of 1,1-Di-(Dimethylallyl)-4-Phenyl-4-Carbethoxy-Piperidinium Bromide*

Using a procedure analogous to that described in Example I, 0.01 mole of 1-dimethylallyl-4-phenyl-4-carbethoxy-piperidine hydrochloride was quaternized with about 0.01 mol of dimethylallyl bromide. The quaternization reaction mixture was refluxed for three hours, and after cooling the resulting crystalline reaction product was recrystallized from acetone. 2.25 gm. (50% of theory) of 1,1-di-(dimethylallyl)-4-phenyl - 4 - carbethoxy - piperidinium bromide of the formula

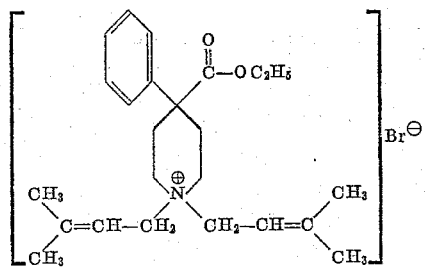

having a melting point of 174–175° C. were obtained.

EXAMPLE V

*Preparation of 1,1-Dihexadienyl-4-Phenyl-4-Carbethoxy-Piperidinium Bromide*

Using a procedure analogous to that described in Example I, 0.01 mol of 1-hexadienyl-4-phenyl-4-carbethoxy-piperidine hydrobromide was quaternized with about 0.01 mol of hexadienyl bromide. The quaternization reaction mixture was allowed to stand at room temperature for twenty-four hours. 3.31 gm. (70% of theory) of 1,1-dihexadienyl-4-phenyl-4-carbethoxy-piperidinium bromide of the formula

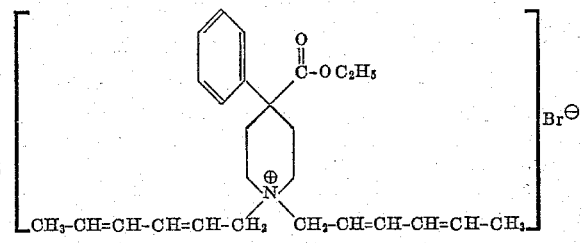

having a melting point of 95–98° C. were obtained.

EXAMPLE VI

*Preparation of 1,1-Diallyl-4-Phenyl-4-Carbomethoxy-Piperidinium Bromide*

Using a procedure analogous to that described in Example I, 0.01 mol of 1-allyl-4-phenyl-4-carbomethoxy-piperidine hydrobromide was quaternized with about 0.01 mol of allyl bromide. The quaternization reaction mixture was allowed to stand at room temperature for two hours, and the resulting crystalline reaction product was recrystallized from a mixture of acetone and water. 3.6 gm. (95% of theory) of 1,1-diallyl-4-phenyl-4-carbomethoxy-piperidinium bromide of the formula

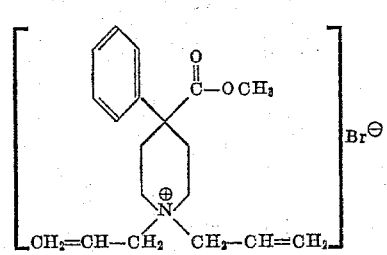

having a melting point of 202° C. were obtained.

EXAMPLE VII

*Preparation of 1,1-Dipropargyl-4-Phenyl-4-Carbobutoxy-Piperidinium Bromide*

Using a procedure analogous to that described in Example I, 0.01 mol of 1-propargyl-4-phenyl-4-carbobutoxy-piperidine hydrobromide was quaternized with about 0.01 mol of propargyl bromide. The quaternization reaction mixture was allowed to stand at room temperature for twenty-four hours, and the resulting crystalline reaction product was recrystallized from a mixture of alcohol and ether. 3.8 gm. (91% of theory) of 1,1-dipropargyl-4-phenyl - 4 - carbobutoxy - piperidinium bromide of the formula

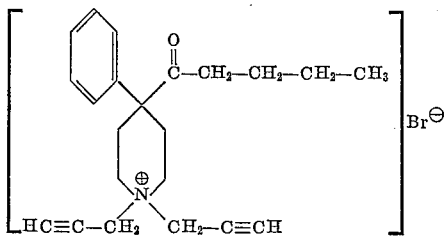

having a melting point of 171° C. were obtained.

EXAMPLE VIII

*Preparation of 1,1-Diallyl-4-Phenyl-4-Carbopropoxy-Piperidinium Bromide*

Using a procedure analogous to that described in Example I, 0.01 mol of 1-allyl-4-phenyl-4-carbopropoxy-piperidine hydrobromide was quaternized with about 0.01 mol of allyl bromide. The quaternization reaction mixture was refluxed for three hours, and after cooling the resulting crystalline reaction product was recrystallized from a mixture of acetone and ether. 3.3 gm. (81% of theory) of 1,1-diallyl-4-phenyl-4-carbopropoxy-piperidinium bromide of the formula

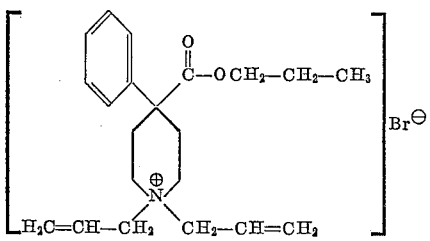

having a melting point of 131° C. were obtained.

The 4-phenyl-4-carbalkoxy-piperidinium compounds according to the present invention exhibit useful pharmacodynamic properties. More particularly, the compounds embraced by Formula I above exhibit effective analgesic activities and, in addition, exhibit pronounced morphine-antagonistic activities. These properties are unexpected and surprising for a compound containing a quaternary nitrogen atom in view of the fact that it was heretofore believed by those skilled in the art that a tertiary nitrogen atom is an essential criterion for central alalgesic activity and that quaternization of this tertiary nitrogen atom causes the analgesic activity to disappear [see O. J. Braenden, N. B. Eddy and H. Halbach, Bulletin of the World Health Organization, vol. 13 (1955), page 939].

The compounds according to the present invention also give evidence of being non-habit forming, as indicated by the fact that one representative member of the group, 1,1-diallyl-4-phenyl-4-carbethoxy - piperidinium bromide, did not suppress or eliminate the withdrawal symptoms of morphine-addicted monkeys.

The morphine-antagonistic activity of the compounds of the present invention was most effectively demonstrated in the following tests: A statistically significant number of adult white mice were injected with 15 mgm./kg. body weight of morphine, that is, the $ED_{50}$ of morphine (dose of morphine which produces detectable analgesia in 50% of the animals by the Haffner method). The morphine was allowed to take effect, and then varying amounts of 1,1-diallyl-4-phenyl-4-carbethoxy-piperidinium bromide were injected. After a time interval to permit the second injection to take effect, the animals were tested for detectable analgesia and the percentage of mice showing detectable analgesia was recorded. The following table shows the results of this test.

TABLE

| Amount of 1,1-diallyl-4-carbethoxy - 4 - phenyl-piperidinium bromide injected per kg. body weight: | Percentage of mice with detectable analgesia, percent |
|---|---|
| 10 mgm./kg. | 10 |
| 3 mgm./kg. | 30 |
| 1 mgm./kg | 60 |
| 300 γ/kg. | 20 |
| 100 γ/kg. | 20 |
| 30 γ/kg. | 20 |
| 10 γ/kg. | 0 |

The strong morphine-antagonistic activity at dosages of less than 1 mgm./kg. is especially remarkable.

By virtue of their effective morphine-antagonistic properties the compounds according to the present invention, and especially 1,1-diallyl-4-phenyl - 4 - carbethoxy - piperidinium bromide, lend themselves especially well for administration in conjunction with isotonic aqueous solutions of such powerful analgesics as morphine, meperidine or methadone and their non-toxic acid addition salts. When used in this manner the piperidinium compounds of the present invention effectively antagonize the undesirable physiological side effects, especially respiratory depression, of the known powerful analgesics without interfering with their desirable main effect. More particularly, for example, the administration of 0.5–1 mgm. of 1,1-diallyl-4-phenyl-4-carbethoxy - piperidinium bromide will effectively antagonize the undesirable physiological side effects of 15–20 mgm. of morphine or 5–10 mgm. of methadone or 80–100 mgm. of meperidine, without interfering with the desirable main effect, that is, analgesia.

The following are illustrative examples of dosage unit compositions, in ampule form, containing 1,1-diallyl-4-phenyl - 4 - carbethoxy - piperidinium bromide as a side-effects-antagonizing ingredient:

(a) | Mgm.
---|---
1,1-diallyl-4-phenyl-4-carbethoxy-piperidinium bromide | 0.5
Morphine.HCl | 20.0
0.001 N HCl, q.s. ad. 1 ml. |

(b)

| | |
|---|---|
| 1,1-diallyl-4-phenyl-4-carbethoxy-piperidinium bromide | 0.5 |
| Meperidine hydrochloride | 100.0 |
| Distilled water, q.s. ad. 2 ml. | |

(c)

| | |
|---|---|
| 1,1-diallyl-4-phenyl-4-carbethoxy-piperidinium bromide | 0.5 |
| Methadone hydrochloride | 5.0 |
| Distilled water, q.s. ad. 1 ml. | |

(d)

| | |
|---|---|
| 1,1-diallyl-4-phenyl-4-carbethoxy-piperidinium bromide | 0.5 |
| Methadone hydrochloride | 10.0 |
| Distilled water, q.s. ad. 2 ml. | |

While we have illustrated our invention with the aid of certain specific embodiments, it will be readily apparent to those skilled in the art that our invention is not limited to these embodiments and that various changes and modifications can be made without departing from the spirit of the invention or the scope of the appended claims.

We claim:
1. 1,1-diallyl - 4 - phenyl - 4 - carbethoxy-piperidinium bromide.
2. 1,1-diallyl-4-phenyl - 4 - carbopropoxy-piperidinium bromide.
3. 1,1-dihexadienyl-4-phenyl-4-carbethoxy-piperidinium bromide.
4. 1,1-dipropargyl-4-phenyl-4-carbobutoxy-piperidinium bromide.
5. 1,1-diallyl-4-phenyl - 4 - carbomethoxy-piperidinium bromide.

References Cited in the file of this patent

UNITED STATES PATENTS

| | | |
|---|---|---|
| 2,167,351 | Eisleb | July 25, 1939 |
| 2,742,397 | Ott | Apr. 17, 1956 |
| 3,004,889 | Kuna et al. | Oct. 17, 1961 |
| 3,012,030 | Janssen | Dec. 5, 1961 |
| 3,012,037 | Janssen | Dec. 5, 1961 |

OTHER REFERENCES

Morrison et al.: "J. Chem. Society," pages 1467–1468 (Part II) (1950).

Costa et al.: "J. Pharm. and Exp. Therapeutics," vol. 113, pages 310–318 (155).